United States Patent [19]

Fischer

[11] Patent Number: 4,799,246

[45] Date of Patent: * Jan. 17, 1989

[54] APPARATUS FOR MEASURING THE THICKNESS OF THIN LAYERS

[76] Inventor: Helmut Fischer, Industriestrasse 21, 7032 Sindelfingen, Fed. Rep. of Germany

[*] Notice: The portion of the term of this patent subsequent to Jun. 24, 2003 has been disclaimed.

[21] Appl. No.: 858,689

[22] Filed: May 2, 1986

Related U.S. Application Data

[62] Division of Ser. No. 487,130, Apr. 21, 1983.

[30] Foreign Application Priority Data

Oct. 23, 1982 [DE] Fed. Rep. of Germany ....... 3239379

[51] Int. Cl.⁴ .............................................. G01B 15/02
[52] U.S. Cl. ...................................... 378/50; 378/206
[58] Field of Search .............. 378/44, 50, 89, 204–206

[56] References Cited

U.S. PATENT DOCUMENTS

| | | | |
|---|---|---|---|
| 4,461,017 | 7/1984 | Koga et al. | 378/44 |
| 4,521,905 | 6/1985 | Hosokawa | 378/50 |
| 4,597,093 | 6/1986 | Fischer | 378/50 |

Primary Examiner—Craig E. Church
Assistant Examiner—John C. Freeman
Attorney, Agent, or Firm—M. Robert Kestenbaum

[57] ABSTRACT

A deflecting mirror is in the optical path between a monocular microscope for viewing the region of a layer on which an X-ray beam falls, and the region of a layer, the thickness of which is measured according to the X-ray fluroescence principle. The mirror is in an apparatus that has an X-ray beam generator which emits an X-ray beam along a longitudinal geometrical axis, a table device arranged to support the layer, a diaphragm device of a material which absorbs X-rays, having an aperture which is in the longitudinal geometrical axis, and a light source which can be directed onto the region for the layer. The mirror is composed of glass and has a hole at 45° to the plane of the mirror. The longitudinal geometrical axis of the X-ray beam passes through the hole.

5 Claims, 4 Drawing Sheets

APPARATUS FOR MEASURING THE THICKNESS OF THIN LAYERS

This is a division of application Ser. No. 487130, filed Apr. 21, 1983.

The invention relates to an apparatus according to the following description: The apparatus is for measuring the thickness of thin layers according to the X-ray fluorescence principle, having an X-ray beam generator which emits an X-ray beam along a longitudinal geometrical axis, a table device arranged to support a layer which is to be measured, a diaphragm device of a material which absorbs X-rays completely having a through-aperture which is moveable into the longitudinal geometrical axis, a light source for visible light which can be directed onto the position for the layer, a monocular microscope arrangement for viewing the region of the layer on which the X-ray beam falls, and a deflecting mirror in the optical path between the monocular microscope arrangement and the region of the layer.

BACKGROUND OF THE INVENTION

If it is desired to measure the thickness of thin layers on small articles, it is necessary to know, still more accurately, where the X-rays strike the small article, for it is certainly not intended to perform the measurement on the article as a whole. The typical size of the spot on which the measurement is performed varies between a few tenths of a millimeter, up to one millimeter. Small measurement-spots are necessary because knowledge is desired, for example, of the thickness of the layer, precisely at a specified point on the flank of a gearwheel tooth, or of the thickness of the layer in the contact region of a contact tongue, etc.

It is, of course, impossible to see where the X-ray beam strikes the layer.

Of one apparatus which is on the market, it is known, imprecisely, that the surface to be measured can somehow be observed, by means of a mirror, on the one hand, and that the mirror is then pushed away, to be replaced by the irradiating device.

OBJECT AND STATEMENT OF THE INVENTION

The object of the invention is to indicate an apparatus which enables the measured spot to be analyzed with high precision, and in a simple manner.

This object is achieved, according to the invention, by means of the features which are evident from the following description:

The deflecting mirror is composed of a material which, in practical terms, does not absorb X-rays, and the longitudinal geometrical axis of the X-ray beam passes through it. The deflecting mirror is composed of glass and contains a hole which is in line with the longitudinal geometrical axis of the X-ray beam. Despite the fact that the deflecting mirror is composed of glass, low-energy X-rays can still pass through it. The only effect of the hole is a slight attenuation of the light which can easily be made good, while there is no reduction in the sharpness which is absolutely necessary for adjusting the apparatus.

The hole has a longitudinal geometrical axis which is positioned at 45 degrees to the plane of the deflecting mirror. This results in the cross-sectional area of the hole being equal to the effective cross-sectional area, meaning that a comparatively small hole can be made in the mirror. If other angles are used, the cross-section of the hole must then be enlarged in order to ensure that the X-ray beam generator still "sees" the layer.

The hole has a transverse measurement in the range 0.5-2 mm. Preferably, the hole has a transverse measurement of approximately 1 mm. These dimensions have proved successful in practice, and produce virtually no change in the optical properties of the mirror.

The through-bore is now visible, and this bore can be set precisely such that the center of the longitudinal geometrical axis passes through it, thus eliminating a first source of error. Furthermore, that point, on the layer, through which the longitudinal geometrical axis passes, and which is the center of the measurement-spot, is visible. If the viewing microscope had two eye-pieces, it would be possible to see the through-bore with one eye, and to see the layer with the other eye. However, it is also possible to work with a single eyepiece, and, by shifting the optical elements in chronological succession, first to bring the through-bore into sharp focus, and then to bring the layer into sharp focus. The diaphragm device can be composed of an organic glass, or of an inorganic glass. Lead-doped organic glass is, for example, available.

If silicate glass is used, the through-bores can, for example, be produced by ultrasonic machining. The cross-sectional shapes of the through-bores are congruent and always identical, and can be of any geometry which, for example is suited to the object to be measured.

Two preferred illustrative embodiments of the invention are now described. In the drawing.

DETAILED DESCRIPTION OF THE INVENTION

Figure 1:
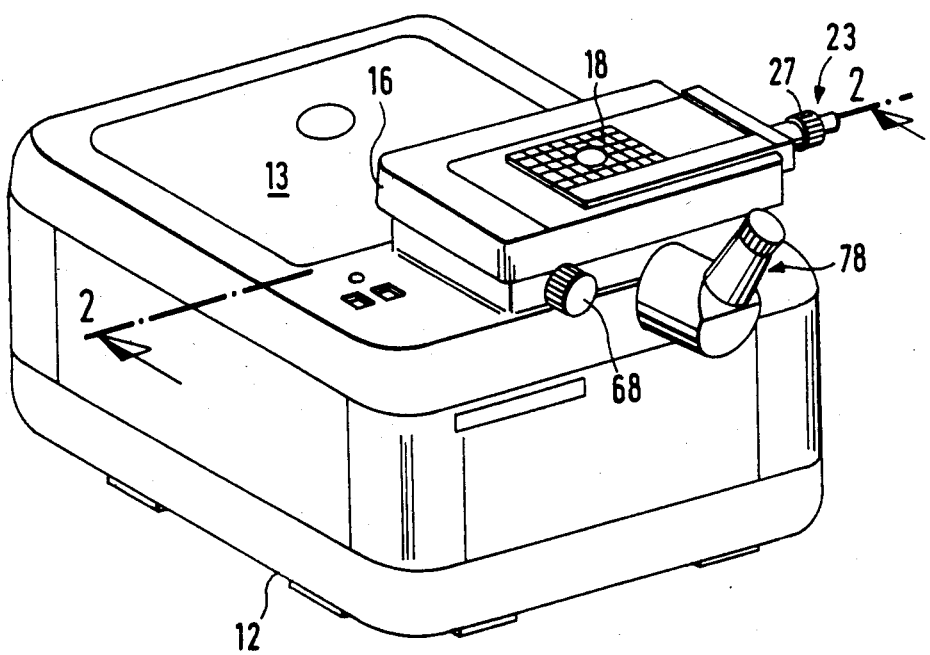
FIG. 1 shows a perspective view of the entire apparatus.

A measuring table 11 possesses a casing 12, of approximately rectangular, flat-sided form. In the front region, an upward-pointed flange 14 projects vertically from its upper surface 13, this flange having a rectangular outline. A skirt 16 fits over this flange 14, this skirt being integral with a horizontal plate 17. In the center, the plate 17 merges into a smaller, rectangular working plate 18 which projects upward, which, on its upper surface, is precisely horizontal, and which carries a network of rectangular coordinates. Equidistant ruled lines 19 run in the "X" direction, and equidistant ruled lines 21 run in the "Y" direction. An open through-hole 22 is provided, extending downwards through the working plate 18 and the plate 17. An X/Y shifting drive 23 is provided, to the right of the assembly comprising the parts 16, 17 and 18, so that the working plate 18 can be moved, in the manner of a microscope stage, according to the arrows 24, 26. If the knurled screw 27 is turned in the directions indicated by the arrow 28, movement takes place along the double arrow 24, in accordance with the direction of rotation.

If the knurled screw 29 is turned in either of the directions indicated by the arrow 31, the working plate 18 moves in one of the directions indicated by the arrow 26. Simultaneous rotation of the knurled screws 27, 29 causes these movements to be superimposed. By this means, the through-hole 22 can be adjusted, in a precise manner, relative to a longitudinal geometrical axis 32, which stands vertically. Parts which span the through-hole 22 can be placed on the working plate 18, and these are then moved, in the same way, relative to the longitudinal geometrical axis 32. If the parts are small, and would fall through the through-hole 22, the latter can be covered with a suitable film, for example a mylar film, and the small parts are placed thereon, so that they likewise participate in the movement of the working plate 18. As before, the small parts can be viewed from the interior of the casing 12, since the film is 4–7 micrometers thick, and is perfectly transparent in the region of the wavelengths of the light.

Figure 2:
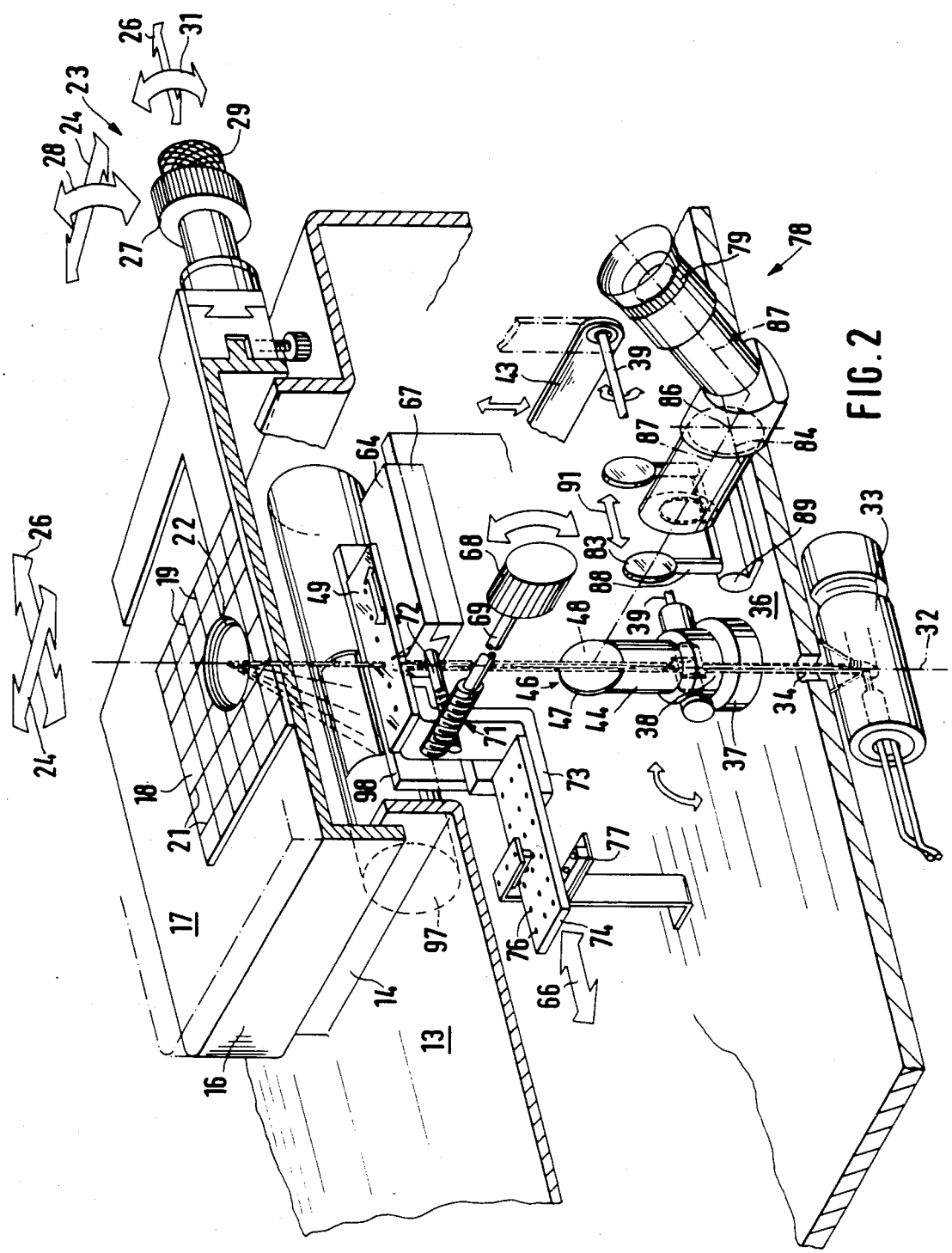
FIG. 2 shows a section, in perspective, on the plane 2—2 in FIG. 1.

For the sake of simplicity, this construction, which has been described in detail by reference to FIGS. 1 and 2, has been omitted from the more simple illustration in FIG. 3.

The beam-generating system of an X-ray tube 33, which produces X-rays, is located in the casing 12, at the bottom. Insofar as these X-rays emerge along the longitudinal geometrical axis 32, they are permitted to pass through a through-hole 34 in a false bottom 36, this hole being coaxial with the longitudinal axis 32. All other beams are held back by the false bottom 36, which is located above the X-ray tube 33. An extension piece 37 is seated on the false bottom 36 and, coaxially, on the through-hole 34, this extension piece 37 being composed of concentric, ring-shaped pieces of tubing. One of these ring-shaped pieces of tubing possesses a double bearing, in which a shaft 39, carrying a lead ball-plug 41, is mounted, in a manner such that its longitudinal geometrical axis intersects the longitudinal axis 32. This ball-plug 41 possesses a through-bore 42, which, in the position drawn in FIG. 3, is coaxial with the longitudinal axis 32, and hence allows the X-ray beam to pass through, in the upward direction. An operating lever 43 is attached to the shaft 39, externally with respect to the casing 12, in a manner preventing rotation. When the operating lever 43 is in the position drawn in FIG. 2, the through-bore 42 is aligned with the longitudinal axis 32, and permits the X-ray beam to pass through. In the position of the operating lever 43, drawn in FIG. 2 with a broken line, the shaft 39 has been rotated through 90°, according to the double arrow, and the through-bore 42 is located at rightangles to the axis 32, so that no X-rays emerge via the ball-plug 41. As shown in FIG. 2, the tubular piece 38 emerges, after a reducing piece, into an upper tubular piece 44, which is coaxial with the longitudinal axis 32, is sliced-off, in its upper end region, at an angle of 45°, and there carries a mirror 46 which functions in the visible-light region. This mirror is composed of an acrylic glass disk 47, onto the rear of which an aluminum coating 48 has been vapor-deposited. The mirror 46 cannot move, is inclined at an angle of 45°, and the longitudinal axis 32 passes through its center. The mirror 46 is also inclined, at 45°, with respect to the longitudinal axis 32. The X-rays pass through the mirror 46, without being attenuated, and continue along the longitudinal axis 32. A diaphragm device is installed above the mirror 46, accurately horizontally and perpendicular to the longitudinal axis 32, of which device only one glass body 49 is illustrated, for the sake of simplicity. This glass body is composed of lead crystal. Its height is 6 mm, its width is 15 mm, and its length is 50 mm. It has a very high lead content. Its upper surface 51 is plane-parallel with respect to its lower surface 52, and these surfaces are perpendicular to the longitudinal axis 32. The upper surface and the lower surface, 51 and 52, are ground and polished. The glass itself is transparent, the attenuation of the visible light being negligible, and the view through the glass body 49 is not subject to distortion. The glass body 49 is composed of two flat-faced rectangular strips 53, 54. The end-face 56 of the strip 53 is wrung against the end-face 57 of the strip 54. A gap, which may under some circumstances form between the end-faces 56 and 57, has a width of less than 0.1 micrometer. Although X-rays may be able to pass through this gap, the proportion which does so is negligible.

Before the strips are wrung together, through-bores 58, 59, 61, 62 have been ultrasonically machined into the end-face 56, these through-bores possessing, in the assembled condition, rectangular cross-sections of various sizes, and running precisely parallel to the longitudinal axis 32. Half of a through-bore 63, which has a circular cross-section, is machined into the strip 53, and its other half is machined into the strip 54. The spacing of the through-bores, 58 to 63, considerably exceeds the typical width of the X-ray beam which runs along the longitudinal axis 32 above the mirror 46. If, therefore, the longitudinal geometrical axis 32 runs through the through-bore 58, nothing passes through the through-bore 59, and the same holds good for the analogous positions.

At its periphery, the glass body 49 is seated in a holder, in a manner which is not illustrated, this holder being rigidly attached to a slide 64, which can be moved at right angles to the longitudinal axis 32, as indicated by the double arrow 66. The slide 64 is guided on a bed 67, by means of a swallowtail. The bed 67 is rigidly attached to the casing. The slide 64 is driven by means of a micrometer drive, which is composed of a rotary knob 68, a shaft 69, a 90° angle-drive mechanism 71, and a shaft 72, the latter being connected to the slide 64. Depending on whether the rotary knob 68 is turned to the left, or to the right, the glass body 49 moves to the left, or to the right, as indicated by the double arrow which can be seen in FIG. 2, and, depending on the extent to which it is rotated, one of the through-bores, 58 to 63, can be brought into line with the longitudinal axis 32. The through-bores 58 to 63 are arranged on a line which, in fact, likewise passes through the longitudinal geometrical axis 32. The holder of the glass body 49 is rigidly attached to a Z-shaped angle-section 73, so that a perforated plate 74, which is connected to this angle-section, in a straight line, can also be moved with the glass body 49. This perforated plate 74 possesses as many lines 76 of holes as there are through-bores. A reader 77, which functions optically, is installed in a manner such that it cannot move with respect to the casing, this reader 77 possessing, on one side, lamps, and, on the other side, light-sensitive diodes. The lines 76 of holes are coded, thus permitting the reading-out of which of the through-bores, 58 to 63, is, at that particular moment, in line with the longitudinal axis 32.

Instead of the rotary knob 68, which can be operated without any further action, another embodiment incorporates a screw-head which can be operated by means of a special key, so that, once having been set, the glass body 49 cannot be repositioned without a further manipulation.

Figure 4:
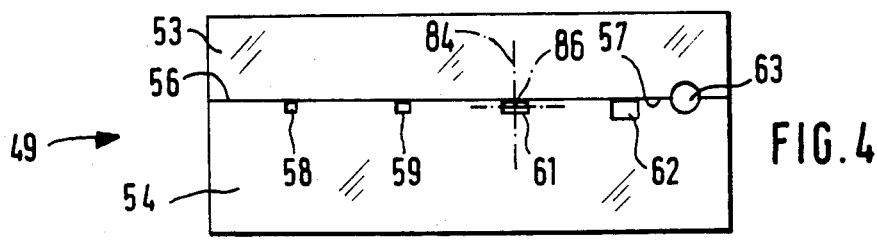
FIG. 4 shows the plan view of a glass body.
Figure 5:
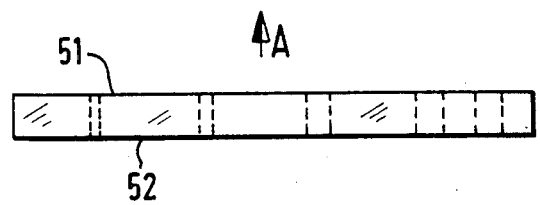
FIG. 5 shows the view according to the arrow A in FIG. 4.

A monocular microscope arrangement 78 possesses an eyepiece 79. The associated housing contains a deflecting mirror 81, which sends the rays of light, which arrive horizontally, to the eyepiece 79, and to the eye of the observer. An objective 82 is installed in the horizontal tube portion of the monocular microscope arrangement 78, at the inner end of this tube portion. If a collecting lens 83 is pushed in front of this objective 82, the lower surface 52 of the glass body 49 is seen in sharp focus. Cross-hairs 84 are also incorporated into the monocular microscope arrangement 78, these cross-hairs 84 intersecting, at the point 86, in the center of the optical axis 87 of the monocular microscope arrangement 78. In its horizontal region, this optical axis 87 strikes the longitudinal geometrical axis 32. Above the point at which the optical axis 87 strikes the mirror 46, the optical axis 87 runs precisely in the longitudinal geometrical axis 32. If, accordingly, the intersection point 86 of the cross-hairs 84 is located, as shown in FIG. 4, at the center of the through-bore 61, the center of the bundle of X-rays is likewise located in the through-bore 61, and it is certain that X-rays are now passing through the entire cross-section of the through-bore 61.

The collecting lens 83 stands on a column 88, which can be moved at rightangles to the optical axis 87, as indicated by the double arrow 91, in a guide 89 which is rigidly attached to the casing. In one of its positions, the collecting lens 83 is active, while it is inactive in its right-hand position according to FIG. 2.

In its inactive position, the optical system of the monocular microscope arrangement 78 is such that the lower surface 92 of a layer 93, resting on the working plate 18, is now imaged, in sharp focus, for the eye of the observer. The distance between this layer 93 and the glass body 49 is sufficiently large to prevent the through-bore in the glass body 49, which bore has been set, from being seen, and it is likewise no longer possible to see the end-faces 56, 57.

Figure 3:
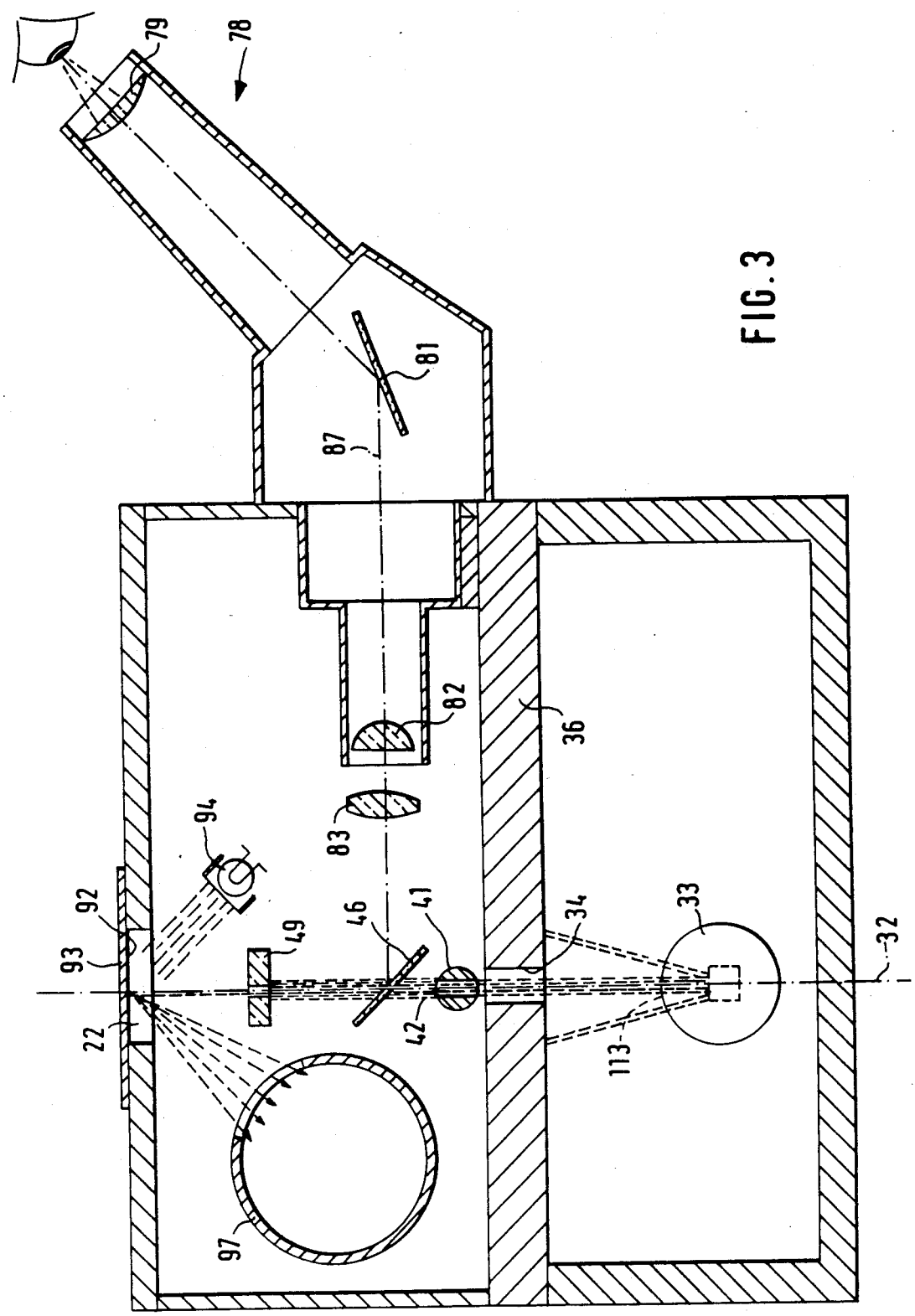
FIG. 3 shows a diagrammatic section, perpendicular to the plane 2—2.

A light source 94 is employed for illuminating the lower surface 92, this light source 94 being installed, rigidly attached to the casing, and shining into the through-hole 22 from below, as shown in FIG. 3.

Figure 6:
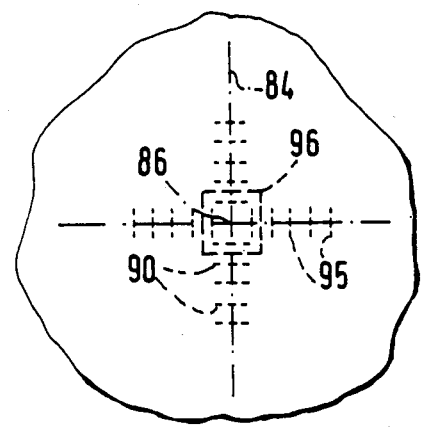
FIG. 6 shows the view of a portion of the lower surface of a layer which is to be measured.
Figure 7:
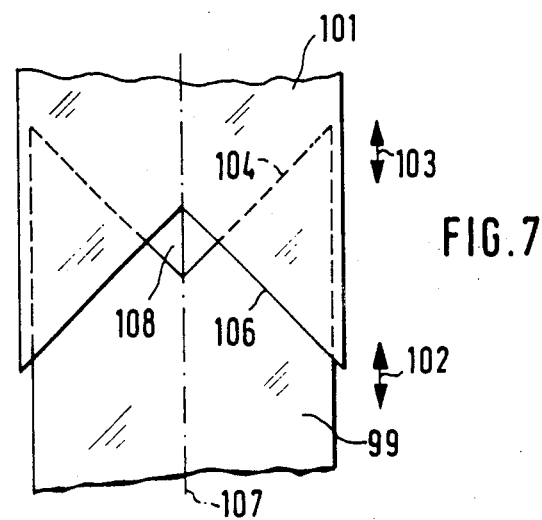
FIG. 7 shows a diagrammatic plan view of a second type of diaphragm device.

FIG. 6 now shows the cross-hairs 84 on the lower surface. The intersection point 86 now indicates, once again, the position of the center of the X-ray beam. On the axes, the cross-hairs 84 have graduations 95, 90. Since the outline 96 of the through-bore 61 has previously been seen, it is also known, on observing the lower surface 92, that the outline of the X-ray beam accurately corresponds to the outline 96 shown in FIG. 6. The dimensions of the region on which the X-rays are incident can be measured with the aid of the graduations 95, and, moreover, this region can be accurately defined.

The layer 93 reflects X-rays back again, which are received by a proportional-type counter tube 97, which is screened in the forward direction, with respect to the diaphragm device, by means of a screen 98.

Instead of providing the through-bores at fixed locations within a glass body, it is also possible to use two diaphragm-halves, 99 and 101, which are likewise composed of a glass which is transparent to visible light, but which is opaque to X-rays. The diaphragm-half 101 is located above the diaphragm-half 99, and, in particular, with a clearance which is small, but which is sufficient to ensure that, on being moved as indicated by the double arrows 102 and 103, the diaphragm-halves 99, 101 do not scrape against one another. On their mutually adjacent sides, the diaphragm-halves 99, 101 possess V-shaped cutouts, which appear antiparallel and are symmetrical with respect to a central plane 107. As a result of the antiparallel movement of the diaphragm halves 99, 101, the through-hole 108 now becomes larger or smaller, without the intersection point of the diagonals of the square outline of the through-hole 108 departing from the central plane 107.

In this manner, it is possible to produce regularly graded square outlines. If the V-shaped cutouts 104 and 106 are not right-angled, but are acute-angled or obtuse-angled cutouts, rhombic outlines can then be produced. If only one V-shaped cutout 104 is provided, and the cutout 106 is merely a straight end-face (180° "V" cutout), it is then possible to form triangles of different geometries, the central plane 107, through which the longitudinal geometrical axis 32 also passes, always being the principal plane.

The invention therefore achieves the object whereby merely very small masses need to be moved, and moved slowly, so that high accuracy is maintained, even over the long service life of the apparatus.

There are no stops which can wear away, no mechanical shocks, and no additional holding devices, springs, or the like.

Figure 8:
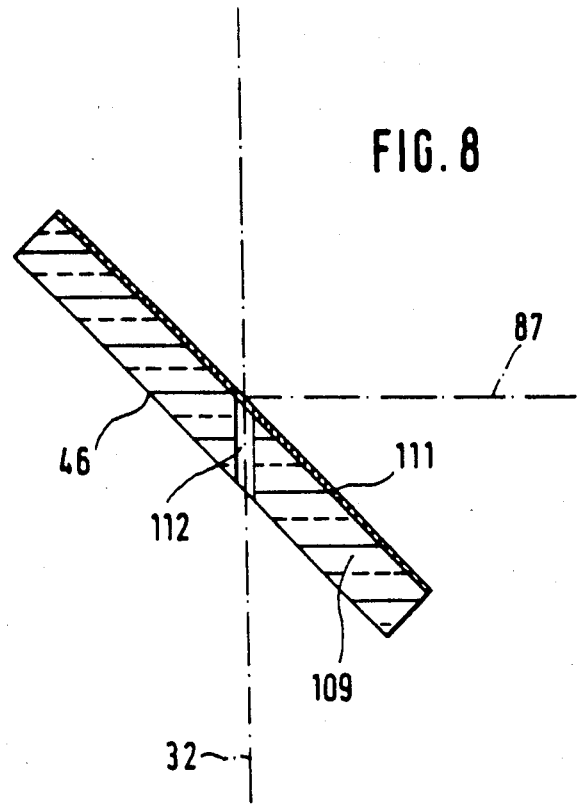
FIG. 8 shows a cross-section through a mirror which is a modified version of the mirror according to the second illustrative embodiment.

In the case of the second illustrative embodiment, FIG. 8 clearly shows that the mirror 46 is composed of a body 109 which is made of an inorganic glass, and onto which a coating 111, of silver or aluminum, has been vapor-deposited. A through-hole 112 which has a circular, cylindrical shape, is machined into the mirror 46, coaxially with the longitudinal geometrical axis 32, this hole 112 having a diameter of 1 mm. Since the mirror 46 is located at an angle of 45° with respect to the longitudinal geometrical axis 32, the through-hole 112 is, in turn, located at an angle of 45° with respect to the mirror 46. The center of the upper opening of the through-hole 112 is located at the point where the longitudinal geometrical axis 32 and the optical axis 87 intersect.

The through-hole 112 can also have an eliptical outline, or an polygonal outline. In order to ensure that sufficient low-energy radiation passes along the longitudinal geometrical axis 32, the X-ray tube 33 possesses a beryllium window 113.

Moreover, the through-hole 112 produces absolutely no scattering of the X-ray beam in this region. The second illustrative embodiment could also enable even smaller through-bores 58, 59, 61, 62, 63 to be achieved. The smallest of these bores could then even be, for example, a 0.05 mm bore, which would then enable measurements to be performed even on tiny objects.

I claim:

1. In an apparatus for measuring the thickness of thin layers according to the X-ray fluorescence principle, having a source of an X-ray beam with a longitudinal geometrical axis, and a viewing arrangement with an optical path, for viewing the region of the layer on which said X-ray beam falls, a deflecting mirror arranged to be positioned in said longitudinal geometrical axis of said X-ray beam and in said optical path between said viewing arrangement and said region of said thin layer on which said X-ray beam falls, said mirror being composed of optically reflecting material and containing a hole which is arranged to be positioned in line with said longitudinal geometrical axis of said X-ray beam.

2. A deflecting mirror as claimed in claim 1, wherein said mirror has a plane and said hole has a longitudinal geometrical axis which is positioned at 45 degrees to said plane.

3. A deflecting mirror as claimed in claim 2 wherein said hole has a transverse measurement in the range of 0.5–2 mm.

4. A deflecting mirror as claimed in claim 3 wherein said hole has a transverse measurement of approximately 1 mm.

5. A deflecting mirror as claimed in claim 1 wherein said optically reflecting material is glass.

* * * * *